Patented Jan. 27, 1942

2,271,362

UNITED STATES PATENT OFFICE 2,271,362

REFRACTORY ALKALINE EARTH CHROMITE CASTING

Theodore E. Field, Louisville, Ky., assignor to Corhart Refractories Company, Louisville, Ky., a corporation of Delaware No Drawing. Application October 11, 1939, Serial No. 299,037

10 Claims. (Cl. 106—58)

This invention relates to the manufacture of castings in which the major constituent is a chromite of an alkaline earth. Such castings have been found to be very refractory toward heat and chemical attack by fluxes, for example, glass. The method and technique to be employed in manufacturing such castings are substantially those disclosed in U. S. Patent #1,615,750 to Fulcher.

Natural magnesium chromite is found as a major constituent with ferrous chromite in chrome ores. These ores also contain alumina and silica, and as ingredients in burned refractories are known to be quite resistant to both acid and basic fluxes. When it is attempted to improve chrome ore compositions by melting and casting to diminish porosity and eliminate the necessity for fluxing bonds, it is found that magnesia must be kept low to give maximum resistance to chemical attack. I have discovered however that this harmful effect is apparently associated with the simultaneous presence of $Al_2O_3$ and silica which results in the formation of poorly resistant $Al_2O_3.MgO$ and is apparently not to be attributed to any lack of resistance on the part of $MgO.Cr_2O_3$. At any rate I have found that compositions made from chromic oxide and up to 21% magnesia are even more resistant than a cast low magnesia chrome ore alone. When an excess of magnesia over that required for the chromite is used, from the excess, periclase is formed which is poor in resistance to glass. Chromic oxide however is very resistant as a crystalline phase and an excess of this does not lower the resistance. However chromic oxide by itself is very difficult to cast because of its high melting point and ready reduction by the electrodes of the furnace, and it is therefore advantageous to use the full 21% magnesia for this reason as well as to cheapen the batch.

As raw materials one may use chrome green oxide which is produced commercially as a paint pigment, and a good grade of burned or raw magnesite or purer grades of magnesia. The usual impurity of lime does no harm in this case but silica or $Al_2O_3$ should be kept low. A suitable batch would be the following:

1

| Batch | Casting analysis | | |
|---|---|---|---|
| | $Cr_2O_3$ | MgO | CaO |
| 79 chromic oxide | 79 | | |
| 21 burned magnesite | | 20.6 | 0.4 |
| | 79 | 20.6 | 0.4 |

2

| Batch | Casting analysis | | |
|---|---|---|---|
| | $Cr_2O_3$ | MgO | CaO |
| 79 chromic oxide | 79 | | |
| 44 raw magnesite | | 20.6 | 0.4 |
| | 79 | 20.6 | 0.4 |

While such batches are obviously more expensive than chrome ore batches, their use is justified where remarkable resistance is required because of the coloring action of dissolved $Cr_2O_3$ upon glass. This coloring action is so powerful that it may totally exclude a weak refractory from consideration at all rather than making it merely less desirable.

The other alkaline earths also form crystalline chromites from fusion and I have found these also to be very resistant to chemical attack and in some respects superior to the magnesium chromite. At the high temperatures employed, MgO is apparently partially reduced to the gaseous metal which tends to produce pores in the solidifying refractory under some conditions. While such ports are not interconnecting and therefore are not as harmful as the pores in burned refractories, still they do, to a lesser degree, increase the area of flux attack when present. These troubles are avoided when lime or limestone is used in the batch and the batch cost is also decreased. Aside from the cheaper cost of lime the batch is also cheapened by the fact that 27% is required for the chromite because of the higher molecular weight. Mixtures of chromites are also resistant which makes the use of dolomite also feasible. Examples of suitable batches are the following:

1

| Batch | Casting analysis | |
|---|---|---|
| | CaO | $Cr_2O_3$ |
| 73 chromic oxide | | 73 |
| 27 lime | 27 | |
| | 27 | 73 |

2

| Batch | Casting analysis | |
|---|---|---|
| | $Cr_2O_3$ | CaO |
| 73 chromic oxide | 73 | |
| 54 limestone | | 27 |

3

| Batch | Casting analysis | | |
|---|---|---|---|
| | Cr₂O₃ | CaO | MgO |
| 76 chromic oxide | 76 | | |
| 46 raw dolomite | | 15 | 9 |

While the use of lime cheapens the batch and gives non-porous castings these have still one shortcoming in that they are apt to contain a small amount of calcium carbide. In service some reducible material in the glass may oxidize this carbide producing a gas which by its stirring action tends to accelerate diffusion of saturated interface layers of glass and therefore increase corrosion. How important this may be, naturally depends on the use to which it is subjected.

From this standpoint the use of strontium oxide or barium oxide is advantageous as these appear to be much less reactive with the electrodes at the temperatures required for melting. With strontium oxide, 40% is required to form the chromite. While the manufactured carbonate is more expensive than chrome green oxide, the natural sulphate, celestite, is cheaper and can be used. With barium oxide 50% is required for the chromite and this batch uses the least of the expensive chromic oxide. BaO seems also to have the greatest fluxing action on chromic oxide so that these castings are the easiest to produce. They are however, refractory at any temperatures used in commercial glass melting and are as resistant as the other chromites. As with all the alkaline earth chromites, excess $Cr_2O_3$ does no harm but makes the batch more expensive while excess alkaline earth above that required for the chromite rapidly decreases resistance. Except where mixtures occur in natural raw materials as in dolomite, there is little point in using mixtures unless it is desired to increase the fluxing action. Suitable batches for the strontium and barium chromites are the following:

1

| Batch | Casting analysis | | | |
|---|---|---|---|---|
| | Cr₂O₃ | SrO | BaO | SiO₂ |
| 60 chromic oxide | 60 | | | |
| 72 celestite | | 36.6 | .8 | 2.4 |
| | 60 | 36.6 | .8 | 2.4 |

2

| Batch | Casting analysis | | |
|---|---|---|---|
| | Cr₂O₃ | BaO | SiO₂ |
| 50 chromic oxide | 50 | | |
| 64 witherite | | 49 | .7 |

3

| Batch | Casting analysis | |
|---|---|---|
| | Cr₂O₃ | BaO |
| 80 chromic oxide | 80 | |
| 26 barium carbonate | | 20 |

In general, the oxides, carbonates, sulphates or other salts may be used in the batch since at the fusion temperature the dissociated gases will be given off. From the standpoint of batch cost it is advantageous to use such natural raw materials as magnesite, limestone, burned limestone, dolomite raw or burned, gypsum, strontianite, celestite, witherite and heavy spar when the service will permit. Silica however should be kept as low as possible as it forms a poor glass phase with the other constituents but the small amount found as impurity in good grades of the above materials can usually be tolerated.

In general the alkaline earth chromites are each very resistant and tests show little differences from one to the other. At very high temperatures these castings when used above the glass line apparently react with condensed alkali vapor and oxygen to give the low melting alkali or alkaline earth chromate. At any rate rapid erosion above the glass line is observed. This does not however occur at the glass line and below the level of the glass even at 1600° C. and its use should be restricted to such positions or to non-oxidizing atmospheres.

In the following claims I use the term "heat cast" to identify a refractory which forms from the solidification of molten material, thereby distinguishing it from a wet cast product.

What I claim is:

1. A heat cast refractory analytically containing not more than 25% magnesia, the remainder being substantially only oxide of chromium.

2. A heat cast refractory substantially free from alumina analytically containing chromic oxide and at least one alkaline earth oxide, the earth oxide content being present in a percentage not substantially greater than that represented by the alkaline earth content of the chromite of said earth or earths.

3. A heat cast refractory analytically containing chromic oxide and an alkaline earth oxide and being substantially free from alumina.

4. A heat cast refractory analytically containing chromic oxide and an alkaline earth oxide and being substantially free from silica.

5. A heat cast refractory analytically containing chromic oxide and an alkaline earth oxide and being substantially free from alumina and silica.

6. A heat cast refractory consisting substantially only of at least one of the crystalline alkali earth chromites.

7. A heat cast refractory consisting substantially only of at least one of the crystalline earth chromites and crystalline chrome oxide.

8. A heat cast refractory analytically containing a substantial percentage of calcium oxide and less than 30% thereof, the remainder being substantially only oxide of chromium.

9. A heat cast refractory analytically containing a substantial percentage of strontium oxide and less than 45% thereof, the remainder being substantially only oxide of chromium.

10. A heat cast refractory analytically containing a substantial percentage of barium oxide and less than 55% thereof, the remainder being substantially oxide of chromium.

THEODORE E. FIELD.